(12) United States Patent
Buford

(10) Patent No.: US 9,678,567 B2
(45) Date of Patent: Jun. 13, 2017

(54) INDICATION OF EYE TRACKING INFORMATION DURING REAL-TIME COMMUNICATIONS

(71) Applicant: Avaya Inc., Basking Ridge, NJ (US)

(72) Inventor: John F. Buford, Princeton, NJ (US)

(73) Assignee: Avaya Inc., Basking Ridge, NJ (US)

( * ) Notice: Subject to any disclaimer, the term of this patent is extended or adjusted under 35 U.S.C. 154(b) by 177 days.

(21) Appl. No.: 14/332,582

(22) Filed: Jul. 16, 2014

(65) Prior Publication Data

US 2016/0018888 A1  Jan. 21, 2016

(51) Int. Cl.
*G06F 3/01* (2006.01)

(52) U.S. Cl.
CPC .................... *G06F 3/013* (2013.01)

(58) Field of Classification Search
CPC ........... H04L 12/1827; H04L 29/06027; H04L 65/403; H04N 7/142; H04N 7/15; H04N 7/147; G06F 3/013
See application file for complete search history.

(56) References Cited

U.S. PATENT DOCUMENTS

| | | | |
|---|---|---|---|
| 6,753,900 B2 | 6/2004 | Runcie et al. |
| 7,460,150 B1 | 12/2008 | Coughlan et al. |
| 7,572,008 B2 | 8/2009 | Elvesjo et al. |
| 8,066,375 B2 | 11/2011 | Skogo et al. |
| 8,120,577 B2 | 2/2012 | Bouvin et al. |
| 8,185,845 B2 | 5/2012 | Bjorklund et al. |
| 8,220,926 B2 | 7/2012 | Blixt et al. |
| 8,314,707 B2 | 11/2012 | Kobetski et al. |
| 8,339,446 B2 | 12/2012 | Blixt et al. |
| 8,342,687 B2 | 1/2013 | Blixt et al. |
| 8,562,136 B2 | 10/2013 | Blixt et al. |
| 8,610,768 B2 | 12/2013 | Holmberg et al. |
| 2008/0143818 A1* | 6/2008 | Ferren ................. H04L 12/1827 348/14.08 |
| 2013/0169560 A1 | 7/2013 | Cederlund et al. |
| 2013/0318457 A1 | 11/2013 | Bjorklund et al. |
| 2013/0321270 A1 | 12/2013 | Bjorklund et al. |
| 2013/0326431 A1 | 12/2013 | Bjorklund et al. |
| 2014/0009390 A1 | 1/2014 | Bjorklund et al. |
| 2014/0043227 A1 | 2/2014 | Skog et al. |
| 2014/0062868 A1 | 3/2014 | Blixt et al. |

FOREIGN PATENT DOCUMENTS

WO    2013033842 A1    3/2013

* cited by examiner

*Primary Examiner* — Shaheda Abdin

(57) ABSTRACT

Embodiments disclosed herein provide methods, systems, and computer readable storage media for indicating eye tracking information during a real-time communication session. In a particular embodiment, a method provides receiving first eye tracking information captured by a first computing system operated by a first user during the communication session with a second computing system operated by a second user, wherein the first eye tracking information represents a first location on a display of the first computing system to where eyes of the first user are directed. The method further provides determining a second location on a display of the second computing system that corresponds to the first location and instructing the display of the second computing system to display a first indication of the second location in real-time with the communication session.

20 Claims, 10 Drawing Sheets

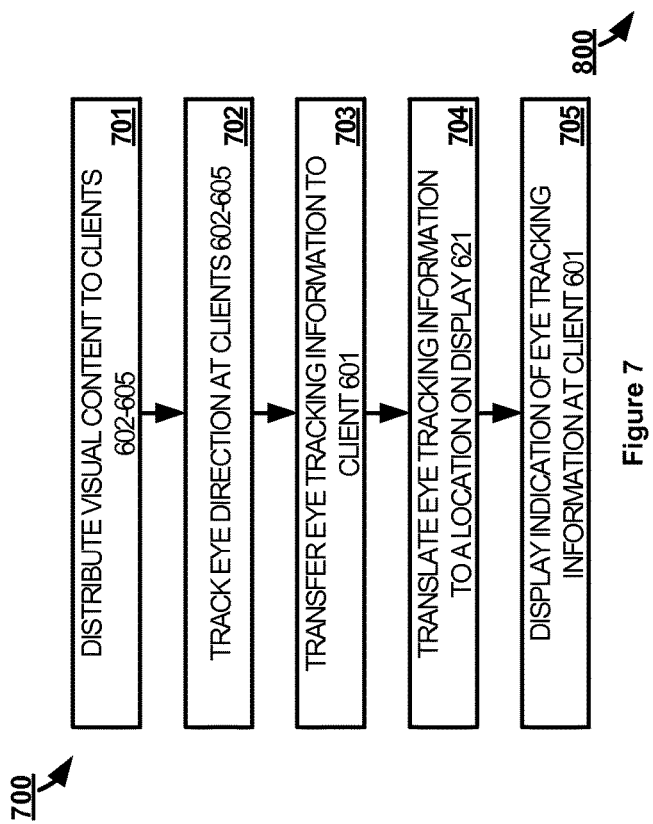
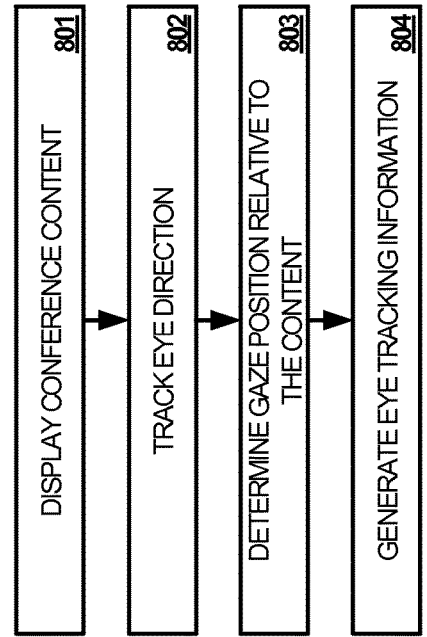

INDICATION OF EYE TRACKING INFORMATION DURING REAL-TIME COMMUNICATIONS

TECHNICAL BACKGROUND

Call centers and audio conferencing solutions have long allowed for parties in multiple locations to speak with one another. Remote parties have therefore been able to participate in discussions or be provided with information without having to be present in the same room. More recently, such communications can occur in conjunction with visual content on a display screen. For example, an audio call may discuss subject matter displayed on users' computer screen. In some cases, such as web-conferencing, the audio communications between parties are integrated into visual content pertaining to the web conference.

When presenting visual content remotely over a communication session, one party does not necessarily know which portion of the visual content upon which another party is looking. For example, the one party may be speaking about one area of the visual content while the listening party is looking at a different area. Since the speaking party has no knowledge of the listening party's confusion, the speaking party is unaware that the listening party may become confused about how the speech relates to the visual content.

OVERVIEW

Embodiments disclosed herein provide methods, systems, and computer readable storage media for indicating eye tracking information during a real-time communication session. In a particular embodiment, a method provides receiving first eye tracking information captured by a first computing system operated by a first user during the communication session with a second computing system operated by a second user, wherein the first eye tracking information represents a first location on a display of the first computing system to where eyes of the first user are directed. The method further provides determining a second location on a display of the second computing system that corresponds to the first location and instructing the display of the second computing system to display a first indication of the second location in real-time with the communication session.

In some embodiments, the method further provides receiving additional eye tracking information that represents additional display locations to where eyes of additional users are directed, determining second additional locations on the display of the second computing system that correspond to the additional display locations, and instructing the display of the second computing system to display additional indications of the second additional locations.

In some embodiments, the method further provides averaging the second location and the second additional locations to generate a composite location, wherein the first indication and the additional indications comprise a single indication of the composite location.

In some embodiments the method further provides removing outlier locations from the second location and the second additional locations before averaging.

In some embodiments, the first indication and each of the additional indications identify a user associated with each respective indication.

In some embodiments, the first indication comprises a graphical overly at the second location.

In some embodiments, the first location corresponds to a location within visual content presented on the display of the first computing system and determining the second location comprises translating the location within the visual content to the visual content as presented on the display of the second computing system.

In some embodiments, the communication session comprises a web conference between at least the first user and the second user and the visual content comprises content displayed during the web conference.

In some embodiments, the method further provides storing the eye tracking information and the communication such that an indication of the eye tracking information can be displayed in conjunction with a replay of the communication session.

In another embodiment, a computer readable storage medium having instructions stored thereon for operating an eye tracking information system is provided. The instructions, when executed by the eye tracking information system, direct the eye tracking information system to receive first eye tracking information captured by a first computing system operated by a first user during a communication session with a second computing system operated by a second user, wherein the first eye tracking information represents a first location on a display of the first computing system to where eyes of the first user are directed. The instructions further direct the eye tracking information system to determine a second location on a display of the second computing system that corresponds to the first location and instruct the display of the second computing system to display a first indication of the second location in real-time with the communication session.

In yet another embodiment, a computer readable storage medium having instructions stored thereon for operating a computing system operated by a first user is provided. The instructions, when executed by the computing system, direct the computing system to, during a communication session, identify a first location on a display of the computing system to where eyes of the first user are directed and generate eye tracking information representing the first location. The instructions further direct the computing system to transfer the eye tracking information to a second computing system, wherein the second computing system displays an indication of a second location corresponding to the first location in real-time with the communication session.

BRIEF DESCRIPTION OF THE DRAWINGS

FIG. 7 illustrates an operation of the communication system for indicating eye tracking information during a real-time web conferencing session.

FIG. 8 illustrates an operation of the communication system for indicating eye tracking information during a real-time communication session.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
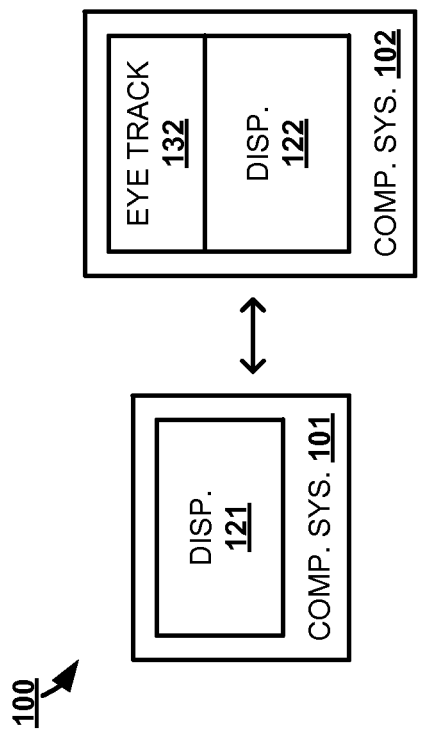
FIG. 1 illustrates a communication system for indicating eye tracking information during a real-time communication session.

FIG. 1 illustrates communication system 100. Communication system 100 includes computing system 101 and computing system 102. Computing system 101 includes display 121. Computing system 102 includes display 122 and eye tracking system 132. Computing system 101 and computing system 102 exchange communications over wired or wireless communication links.

In operation, computing systems 101 and 102 are operated by respective users. Computing systems 101 and 102 are capable of exchanging real-time communications on behalf of the users. The real-time communications may comprise audio, video, photos, graphics, presentation slides, whiteboard sharing, website co-browsing, or any other type of media that can be exchanged over communication links—including combinations thereof. During a real-time communication session that includes an associated display of visual content on display 122 for the user of computing system 102, the user of computing system 101 may benefit from knowing upon which part of the visual content the user of computing system 102 is focused.

For example, the user of computing system 101 may be explaining something concerning a portion of the visual content currently being displayed on display 122. If the user of computing system 102 is not looking at the portion of the visual content on display 122 to which the explanation concerns, then the user of computing system 102 may not be following the explanation. Knowing where the user of computing system 102 is looking on display 122 would allow the user of computing system 101 to better direct the user of computing system to the visual content portion of concern.

Figure 2:
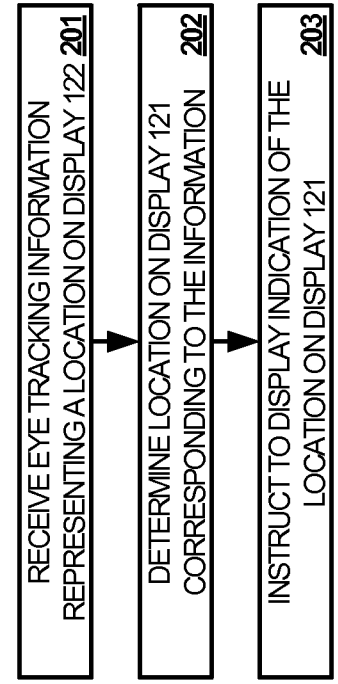
FIG. 2 illustrates an operation of the communication system for indicating eye tracking information during a real-time communication session.

FIG. 2 illustrates an operation 200 of communication system 100 for indicating eye tracking information during a communication session. The communication session may be voice, video, text, or any other type of communication session—including combinations thereof. Furthermore, the communication session is associated with visual content displayed on display 122 and at least a version of which is also displayed on display 121. The visual content may be displayed as part of a web conference, an application or screen sharing session, a web co-browsing session, or some other way by which display 121 and 122 could display the same visual content—including combinations thereof.

Operation 200 receives first eye tracking information captured by eye tracking system 132 of computing system 102 operated by a first user during the real-time communication session with computing system 101 operated by a second user (step 201). The first eye tracking information represents a first location on display 122 of computing system 102 to where eyes of the first user are directed. This first location is sometimes referred to as a gaze point.

Operation 200 then determines a second location on display 121 of computing system 101 that corresponds to the first location (step 202). In other words, since display 121 and display 122 may not be identical displays presenting visual content in an identical manner, the location upon which the eyes of the first user are directed in display 122 may not directly correspond to a location on display 121. Therefore, step 201 provides for any translation that may be needed in order to best represent, on display 121, a screen location on display 122 to which the eyes of the first user are directed. In one example, content displayed on display 122 may be positioned and sized differently than that same content being displayed on display 121. Accordingly, simply indicating the same screen location on display 121 as was detected by eye tracking system 132 on display 122 may not correspond on display 121 to the relevant visual content location upon which the first user was looking.

After determining the second location, operation 200 instructs display 121 to display an indication of the second location in real-time along with the communication session (step 203). The indication may comprise any sort of indication on display 121 that the second user can interpret as corresponding to where the first user is looking on display 122. For example, a graphic may be overlaid on visual content displayed on display 121. The graphic may take any shape and may be opaque or have some amount of transparency so that the content can be viewed underneath. Alternatively, the visual content may be highlighted in the second location, a graphical arrow may point to the second location, a graphical window separate from the visual content may describe the second location (e.g. "header of page," "leftmost graphic," etc.), or any other type of indication understandable by a human operator.

Since the indication is being displayed in real-time with the communication session, the second user is able to know where the first user is looking at any given point in the communication session. Advantageously, the second user's knowledge of where the first user is looking on display 122 allows the second user to ensure the first user is focusing on a portion of the displayed content that is relevant to the communication. For example, if the second user is speaking about one portion of the content on display 122 and the indication shows that the first user is looking at a different portion of the content, then the second user can direct the first user to look at the correct portion of the content.

It should be understood that operation 200 may continue throughout the communication. Thus, the second user is consistently aware of where the first user is looking in real-time during the communication aside from typically negligible delays caused by information processing, communication networks, etc. If the number of eye tracking samples of the first user in a period of time is large, then the indication on display 121 may jump around quickly, which may be distracting for the second user. To prevent this unnecessary jumping of the indicator, the operation may further "smooth" the eye tracking samples to essentially display an average of the samples for a period of time. Averaging the tracking samples over time prevents the indicator from jumping around, which does not necessarily provide the second user with relevant information.

In some embodiments, computing system 101 may also include an eye tracking system akin to eye tracking system 132. Operation 200 could therefore also be performed in the opposite direction as described above. That is, eye tracking information could be captured at computing system 101 and then transferred to computing system 102 for an indication of such to be displayed on display 122.

Additionally, the eye tracking information may be stored on a storage system either in computing system 101 or another computing system. The communication session and visual content may also be recorded. Recording this data allows for a replay of the communication session, the visual content associated with the session, and indications of the eye tracking information in synchronization with the communication session.

Referring back to FIG. 1, computing system 101 comprises communication circuitry and processing circuitry in addition to display 121. Computing system 101 may also include a user interface, memory device, software, or some other communication components. Computing system 101 may be a telephone, computer, tablet, e-book, mobile Internet appliance, media player, game console, or some other computing apparatus—including combinations thereof. Display 121 comprises a liquid crystal display (LCD), an organic light emitting diode (OLED) display, a cathode ray tube (CRT) display, a front or rear projection display, or any other type of image presentation technology—including combinations thereof. Display 121 may be incorporated into computing system 101 to form a single unit or may be attached to the rest of computing system 101 as a peripheral.

Computing system 102 comprises communication circuitry and processing circuitry in addition to display 122 and eye tracking system 132. Computing system 102 may also include a user interface, memory device, software, or some other communication components. Computing system 102 may be a telephone, computer, tablet, e-book, mobile Internet appliance, media player, game console, or some other computing apparatus—including combinations thereof. Display 122 comprises a liquid crystal display (LCD), an organic light emitting diode (OLED) display, a cathode ray tube (CRT) display, a front or rear projection display, or any other type of image presentation technology—including combinations thereof. Eye tracking system 132 comprises a plurality of optical sensors (e.g. cameras) to capture a user's eyes. Eye tracking system 132 may further include light projectors, such as near-infrared light projectors, to enhance the optical sensors' ability to capture the user's eyes from patterns that the projectors reflect off the user's eyes. Eye tracking system 132 may either include its own dedicated processing circuitry to process captured optical information or may use the other processing circuitry in computing system 102. Display 121 and eye tracking system 132 may each be incorporated into computing system 102 to form a single unit or may be attached to the rest of computing system 101 as a peripherals.

Computing systems 101 and 102 communicate over one or more communication links that use metal, glass, air, space, or some other material as the transport media. Communication link 112 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. The communication links could be direct links or may include intermediate networks, systems, or devices.

Figure 3:
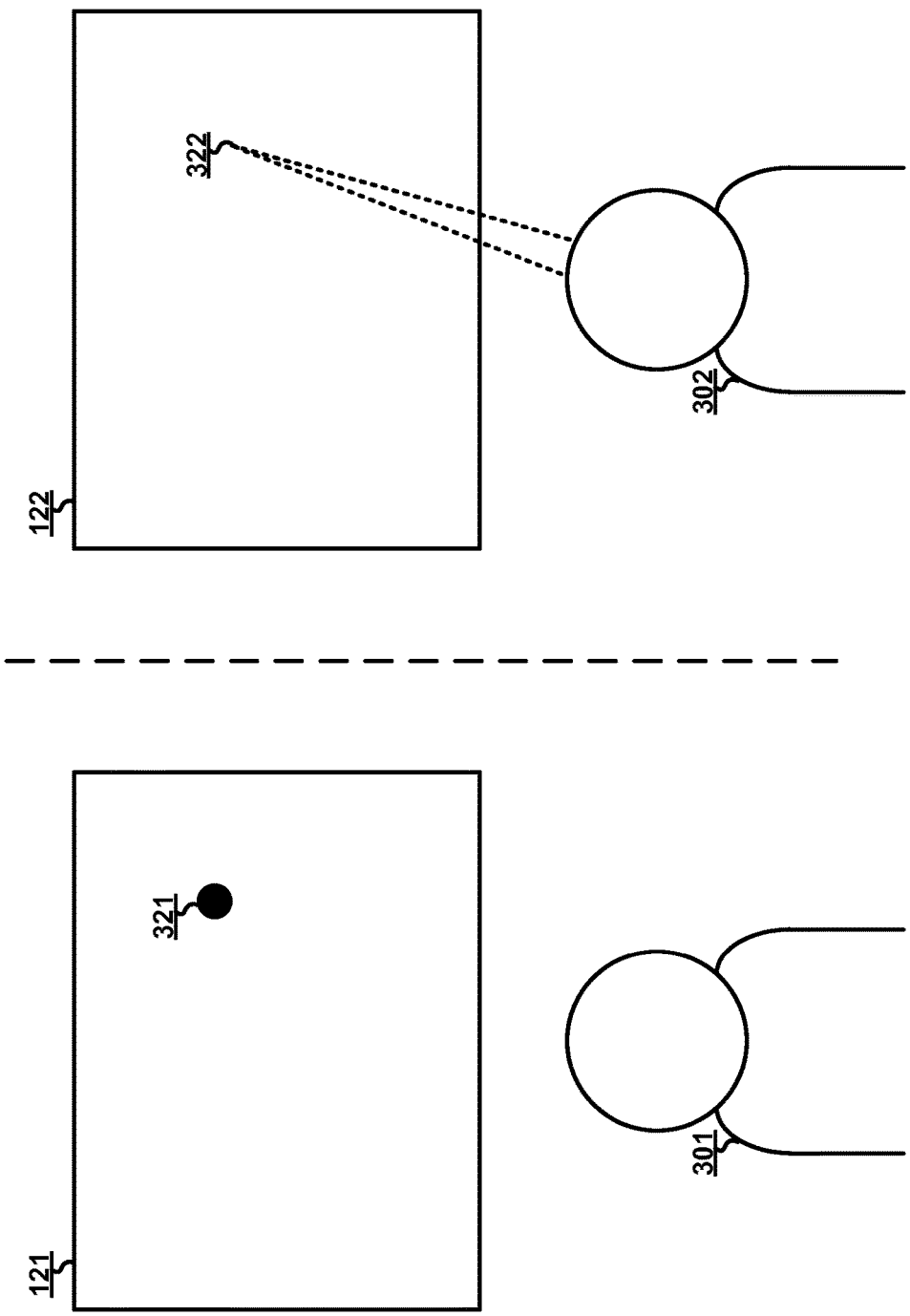
FIG. 3 illustrates an example of indicating eye tracking information during a real-time communication session.
Figure 4:
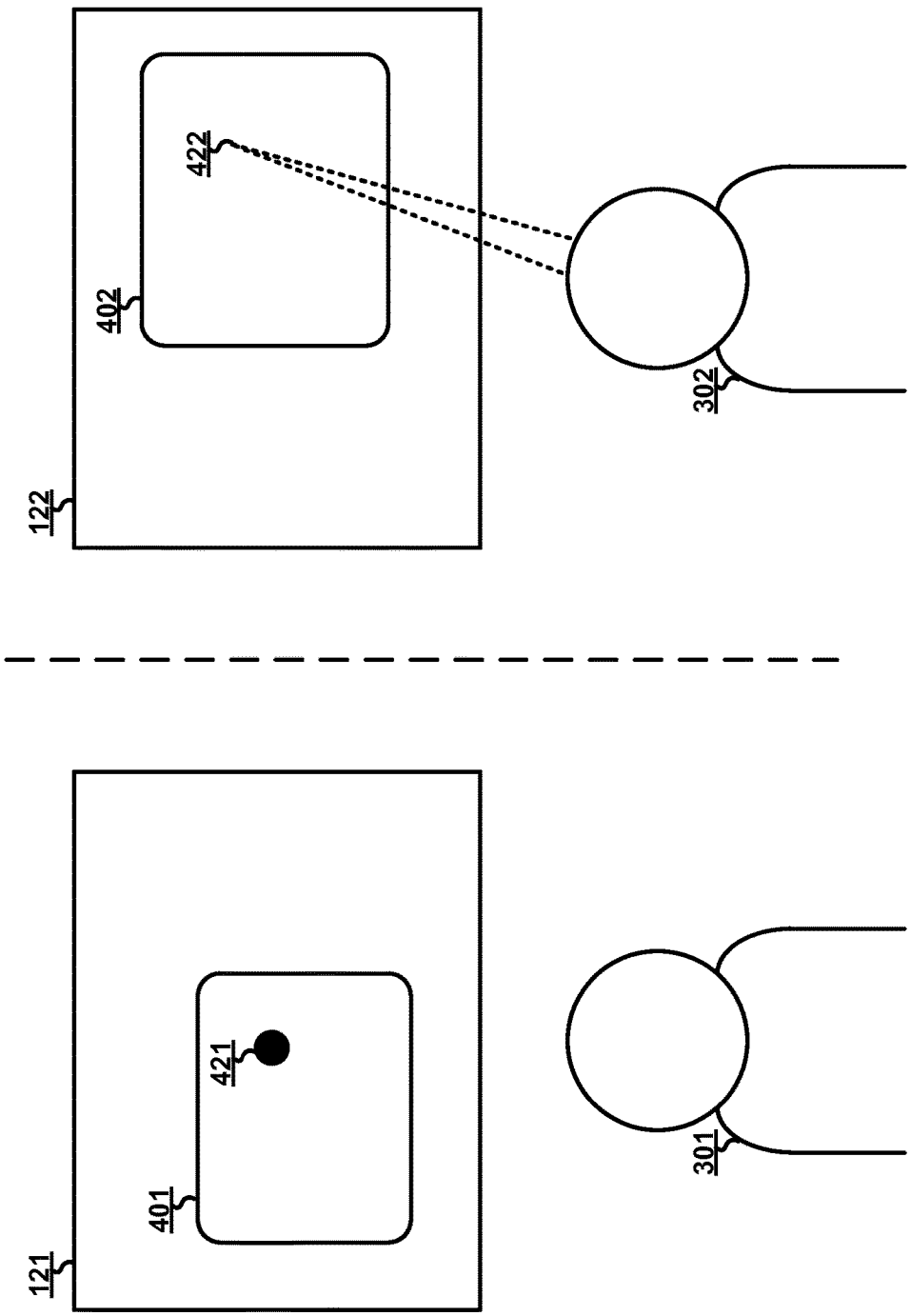
FIG. 4 illustrates an example of indicating eye tracking information during a real-time communication session.
Figure 5:
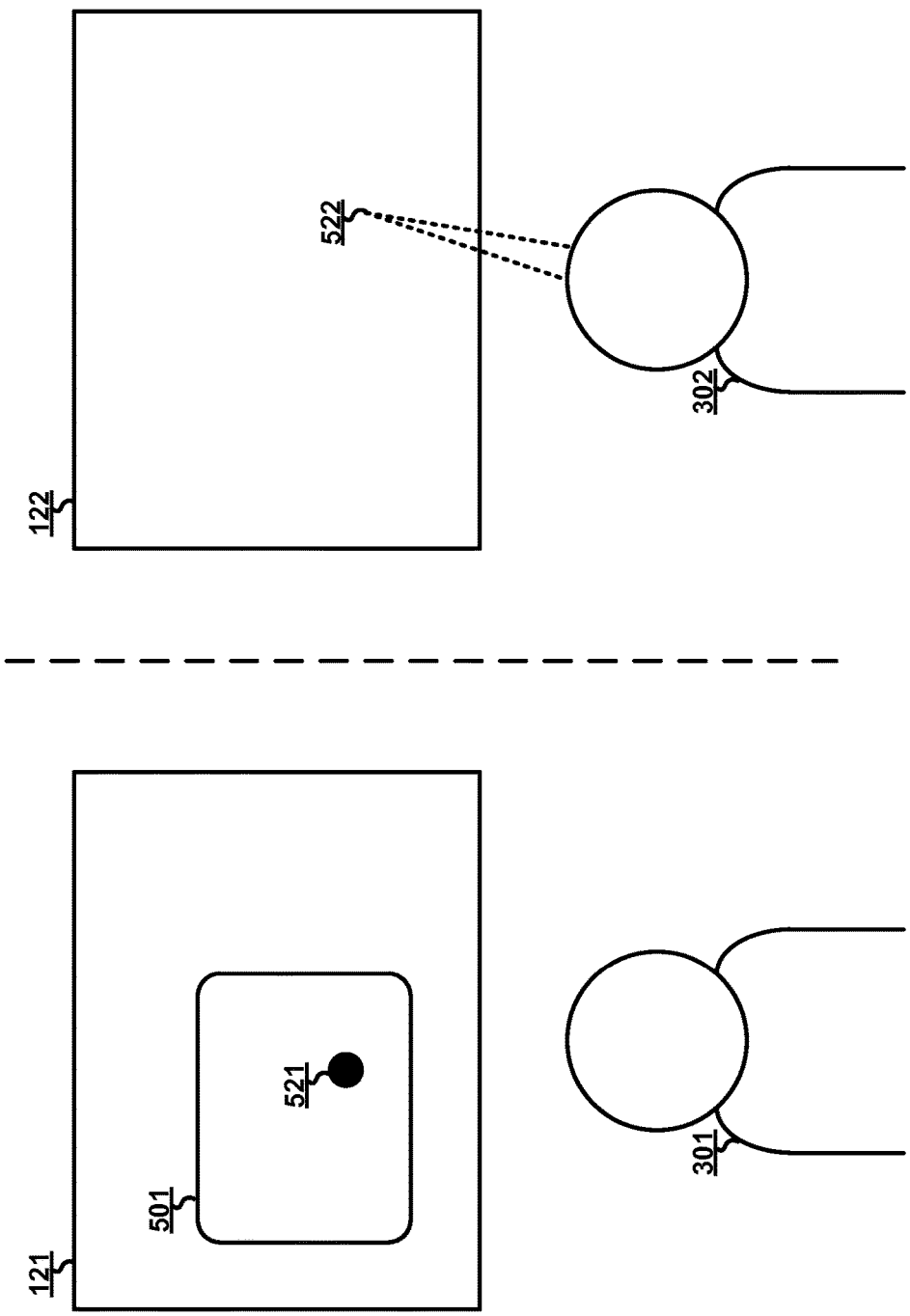
FIG. 5 illustrates an example of indicating eye tracking information during a real-time communication session.

FIGS. 3-5 below illustrate examples for indicating eye tracking information during a communication session. The communication session within the examples is a communication session between two parties. For example, one party may be a call center agent and the other party may be a customer of the company associated with the call center. Accordingly, the communication session may be comprise a conventional phone call between the two parties and the visual content for which eye tracking information is captured is part of a separate session associated with that phone call. For example, if the customer is having trouble operating software, the agent may ask the customer to share the customer's view of the software with the agent's computing system. This may be done through a link sent to the customer's computing system, through the software itself, or by some other means. Once shared and using the eye tracking indications described herein, the agent will be able to better explain the software interface over the call to the customer based on knowledge of where the customer is looking in the software's interface at any given time during the communication session. This situation can also be reversed with the agent being the user operating computing system 102 and the user operating computing system 101, thus allowing the user to better explain to the agent where to look regarding content displayed on the agent's display 122.

Alternatively, the visual content may be part of the communication session itself, as may be the case in a web conferencing configuration. Using the example above, the customer may begin a text chat, audio, or video call with the agent through a web interface and the sharing of the customer's software view is appended to that web based communication. Additionally, uses between users outside of a call center environment are also envisioned.

FIG. 3 illustrates an example of indicating eye tracking information during a communication session. FIG. 3 includes a representative example of display 121 and display 122. A user of computing system 101 is user 301 viewing display 121. A user of computing system 102 is user 302 viewing display 121. User 302 is looking at location 322 on display 122. Computing system 102 identifies location 322 using eye tracking system 132. Using operation 200, eye tracking information is transferred to computing device 102 and indicator 321 is displayed on display 121 to indicate to user 301 that user 302 is looking at location 322.

In the above example, the entirety of displays 121 and 122 are being considered when capturing and displaying an indication of eye tracking information. Such an example may occur in the case of content being displayed full screen on both display 121 and display 122. For example, computing system 102 may be sharing its desktop with computing system 101, or vice versa. This set up allows the translation that occurs at step 202 to be relatively simple because location 322 is not determined in reference to content being displayed only on a portion of the displays. Accordingly, computing system 102 need not translate the eye tracking information indicating location 322 relative to content in order to determine location 321. Rather, computing system 102 may need only to compensate for any difference in aspect ratio, screen resolution, or size between displays 121 and 122 when determining that location 321 corresponds to location 322.

FIG. 4 illustrates another example of indicating eye tracking information during a communication session. As with FIG. 3, FIG. 4 includes a representative example of displays 121 and 122 with users 301 and 302 viewing each respective display. In this example, visual content is displayed within windows 401 and 402 on displays 121 and 122, respectively. User 302 is looking at location 422, which is located within content window 402 on display 122. Computing system 102 identifies location 422 using eye tracking system 132. Using operation 200, eye tracking information is transferred to computing device 102 and indicator 421 is displayed on display 121 to indicate to user 301 that user 302 is looking at location 422 within window 402.

In particular, the eye tracking information indicates location 422 as being a location relative to the content displayed in window 402. From the eye tracking information, step 202 determines a location (i.e. the location of indicator 421) on display 121 and within content window 421 that corresponds to the location 422. Accordingly, even though content window 401 is in a different position, and is a different size and shape, on display 121 than content window 402 is on display 122, indicator 421 is still able to represent to user 301 the portion of the content at location 422.

FIG. 5 illustrates yet another example of indicating eye tracking information during a communication session. Consistent with FIGS. 3 and 4, FIG. 5 includes displays 121 and 122 along with respective users 301 and 302. In this example, content window 501 displays a scaled down version of the content presented on the entirety of display 122. Thus, when user 302 is looking at location 522 on display 122 location information is transferred to computing system 101 indicating location 522. At step 202 of operation 200, location 522 is translated to a location within window 501 corresponding to location 522. Since window 501 is simply a scaled down version of display 122, this translation may be similar to the translation performed in FIG. 3 with window 501 representing the entirety of display 121 in that example. User 301 is thereby informed about where user 302 is looking on display 122.

In any of the above examples, if user 302 is not looking at display 122 or not within a visual content window (e.g. window 422) for which eye tracking information is generated, then computing system 101 may instruct display 121 to present an indicator informing user 301 of that fact. For example, a notification with the words "eyes out of range" may be presented on display 121 to inform user 321 that user 302 is not looking within the bounds of the eye tracking functionality. Of course, alternative indicators may also be used.

Figure 6:
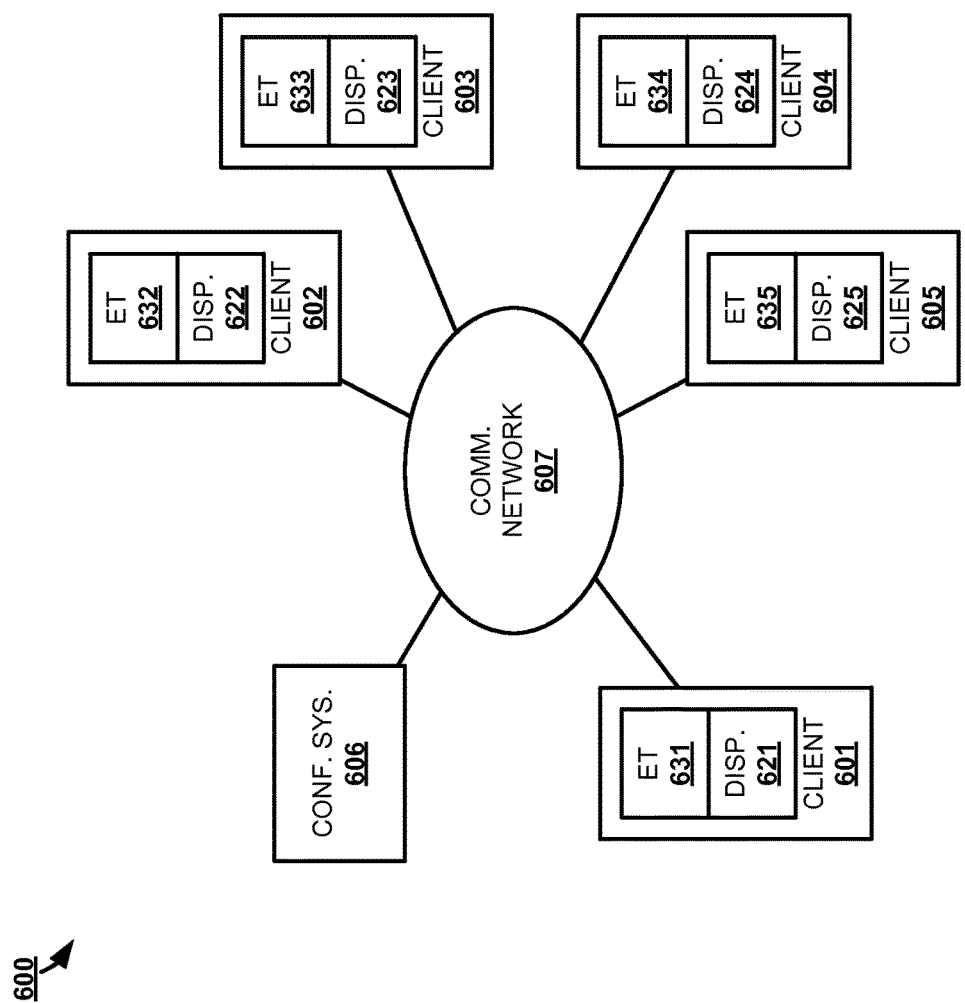
FIG. 6 illustrates a communication system for indicating eye tracking information during a real-time communication session.

FIG. 6 illustrates communication system 600. Communication system 300 includes client devices 601-605, conferencing system 606, and communication network 607 over which elements 601-605 communicate. Client devices 601-605 include eye tracking systems 631-635 and displays 621-625, respectively.

Conferencing system 606 comprises a computer system and communication interface. Conferencing system 606 may also include other components such as a router, server, data storage system, and power supply. Conferencing system 606 may reside in a single device or may be distributed across multiple devices. Communication control system 103 could be an application server or any other type of computing system capable of facilitating a multiparty conference in which visual content is shared—including combinations thereof.

Communication network 607 comprises network elements that provide communications services to client devices 601-605 and conferencing system 606. Communication network 607 may comprise switches, wireless access nodes, Internet routers, network gateways, application servers, computer systems, communication links, or some other type of communication equipment—including combinations thereof. While shown as a single network, communication network 607 may comprise a collection of networks including local area networks, wide area networks, the Internet, or any other type of computing network—including combinations thereof.

In operation, conferencing system 606 facilitates a web conference between two or more participants using two or more of client devices 601-605. Client devices 601-605 are examples of the computing systems disclosed in FIG. 1. Specifically, client devices 601-605 are executing software that allows them to participate in web conferences facilitated by conferencing system 606.

During a web conference, in addition to audio communications from each of the parties on the web conference, the web conference further includes visual content for display. The visual content may include video of at least one of the participants captured by that participants client device to coincide with the audio communications, video captured that does not coincide with the conference audio (e.g. a prerecorded video clip, live video feed of a location outside of the conference, etc.), presentation slides, documents, or any other type of visual information.

As it facilitates the web conference, conferencing system 306 further facilitates the transfer of eye tracking information between the devices. This allows for at least one of the participants to be informed about where the eyes of the other parties in the conference are focused. For example, one party may be presenting the visual information currently displayed as part of the web conference. The knowledge of where the other participants are looking allows the presenter to ensure the other participants are following along with the presentation of the visual content.

FIG. 7 illustrates an operation 700 of communication system 600 for indicating eye tracking information during a web conference session. In operation 700, a presenter is operating client device 301 to display slides as visual content to other participants on the web conference who are operating client devices 602-605 (step 701). The visual content is therefore distributed from client device 601 to each of client devices 602-605 either directly or through conferencing system 606. The content may be streamed to client devices 602-605 in real time with any streaming audio or video of the presenter, or the content may be transferred ahead of time and displayed at client devices 602-605 in conjunction with the audio or video streaming of the presenter (e.g. slides are preloaded but each slide is displayed upon receiving an instruction from client device 301 to do so).

During the presentation of the visual content for the web conference, eye tracking systems 632-635 track the gaze points within the presented visual content of their respective participants on displays 622-625 (step 702). FIG. 8 illustrates operation 800 that each of client devices 602-605 uses to perform steps 702.

In particular, each client device displays the visual content transferred from client device 601 (step 801). While displaying the visual content, each eye tracking system tracks the eye direction of the respective users (step 802). The gaze point relative to the content is determined from the eye tracking (step 803). That is, at step 803, operation 800 determines where within the currently displayed visual content each user is looking. The eye tracking information is then generated to represent where the user is looking relative to the content (step 804).

The eye tracking information includes any information necessary to reproduce where the user was looking within the content. For example, the information may include dimensions of the window displaying the content (if the content is not being displayed full screen), a point within that window corresponding to the gaze point, what portions of the content are filling the window (e.g. the content may be zoomed and scrolled to show different portions rather than the entirety of the currently presented content), dimensions of portions of the display window that are covered by other windows, or any other information relevant to reproducing the gaze point within the content. In some examples, the content may be divided into known segments and the eye tracking information may merely indicate within which segment the gaze point is located. Similarly, the eye tracking information may reference a standard view of the visual content. For example, the visual content may have a native resolution that is used as the standard view. The gaze point may therefore be indicated as a point within this standard view, such as a number of pixels or other measure of distance from a reference point of the standard view (e.g. a corner of the standard view). Other means of translating a location within content presented on one display to that same content presented on another display are also envisioned. Additionally, if the user is not looking within the content, then the eye tracking information may indicate that fact.

Referring back to operation 700, the eye tracking information is then transferred to client 601 either directly from each of client devices 602-605 or through conferencing system 606 (step 703). Upon receiving the eye tracking information, client 601 translates the eye tracking information from each client device 602-605 to a respective location on display 621 (Step 704). Specifically, since display 621 is also displaying the current visual content for the web conference, client 601 translates the visual information into a position within the content displayed as it is being displayed on display 621 (i.e. within the window size, window location, zoom level, etc. of the content displayed on display 621). That is, the translation ensures that each location on display 621 represents the same portion of the content viewed by the users of each client device 602-603.

Once the locations on display 621 have been determined, client device 601 displays an indication of each location on display 621 (step 705). The indication is displayed in real-time so that the presenter of the web conference is aware of where the participants operating client devices 602-605 are looking at any given time during the web conference. An indication may be displayed for each location or a single indication may be displayed that is a product of multiple locations. For example, the locations corresponding to each of client devices 602-605 may be averaged into a single location so that a user of client 601 is informed of a general location within the visual content where the majority of users are looking.

In some examples, the indication for each client includes an identifier for each participant. Including such an identifier allows the presenter to identify which participant is looking at any given area of the visual content. If, for example, one participant is not looking in the correct location, then the presenter can identify that person and direct them towards the proper area.

While the above examples describe the conferencing system 606 as merely facilitating the web conference, conferencing system 606 may also perform the many of the actions on behalf of client device 601. Specifically, conferencing system 606 may receive the eye tracking information from each of clients 602-605 and determine points within the content to where the participants are looking. The conferencing system 606 may then instruct client device 601 to display indicators of the already determined locations. Referring back to FIG. 2, conferencing system 606, or other networked system, may also perform operation 200 on behalf of client 601.

It should be further understood that, while the above examples refer to client 601 as receiving and displaying eye tracking information. Other client devices may also receive and display eye tracking information, including eye tracking information captured by client device 601. Thus, each client device may display indicators of eye tracking information received from the other devices. Alternatively, if the presenter of the web conference changes from being the user of client 601 to the user of client 604, then user client 604 may replace device 601 in operation 700.

Figure 9:
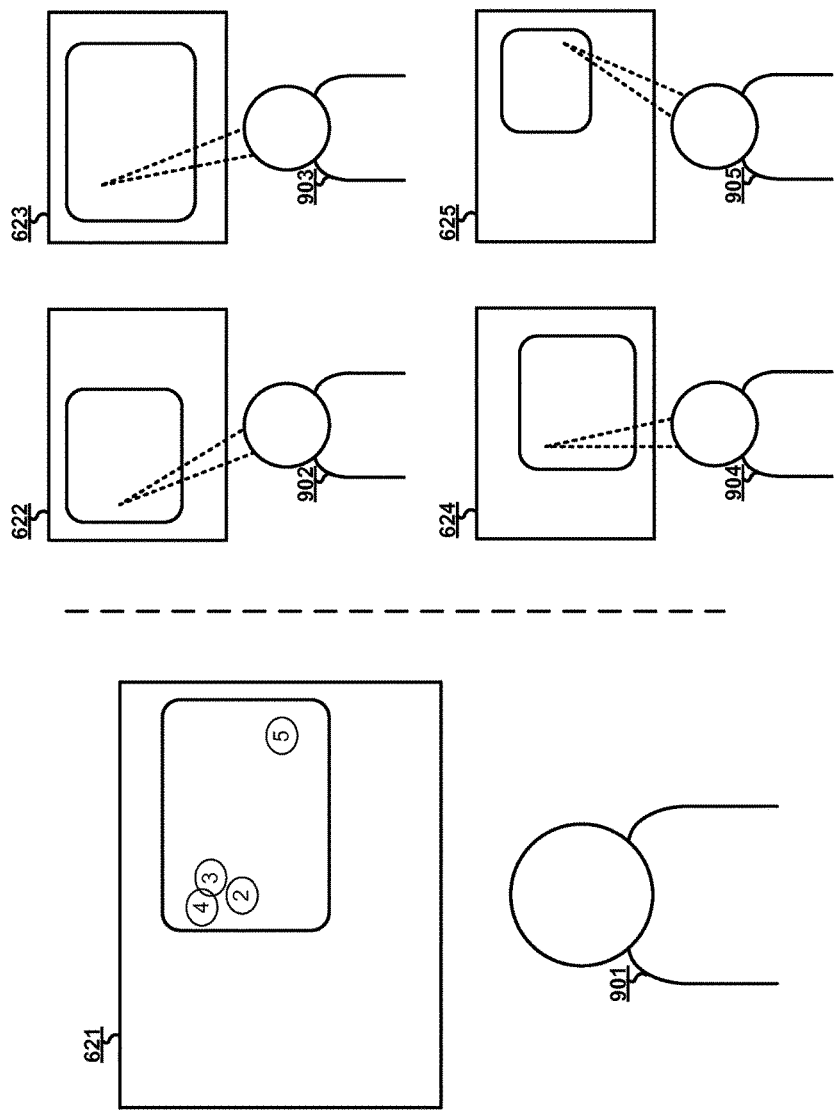
FIG. 9 illustrates an example of indicating eye tracking information during a real-time web conferencing session.

FIG. 9 illustrates an example of indicating eye tracking information during a web conferencing session. FIG. 9 includes a representative example of displays 621-625. A participants 901-905 are operating client devices 601-605, respectively. In this example, participant 901 is presenting visual content during a web conference. Each of displays 621-622 displays visual content for the web conference in a window. Each window is sized differently and may display the visual content at different zoom levels such that the entirety of the content at any given time is not displayed in the window.

As illustrated, participants 902-905 are all looking at points within the content window on their respective displays 622-625. Eye tracking systems 632-635 capture these locations and generate eye tracking information indicating the locations. Upon receiving the eye tracking information, client 601 translates the locations into locations within the visual content relative to how the content is being displayed within the content window on display 621. The location are then displayed on display 621. Specifically, the location in which each participant is looking is represented by a graphic identifying the participant. That is, graphics 2-5 correspond to the locations in which participants 802-905, respectively, are looking within the visual content. In this example, graphical indicator 5 informs the presenter 901 that participant 905 is looking at a different location within the content than is everyone else. Presenter 601 may then choose to direct participant 905 towards the correct location.

As more eye tracking information is streamed to client 601, or received periodically, the graphics on display 621 will move accordingly to keep presenter 901 up to date on the gaze points of participants 902-905. Continuing the above example, once presenter 901 notifies participant 905 of where participant 905 should be looking, and if participant 905 complies with the notification, then presenter 901 will view graphical indicator 5 on display 621 move closer to graphical indicators 2-4.

Figure 10:
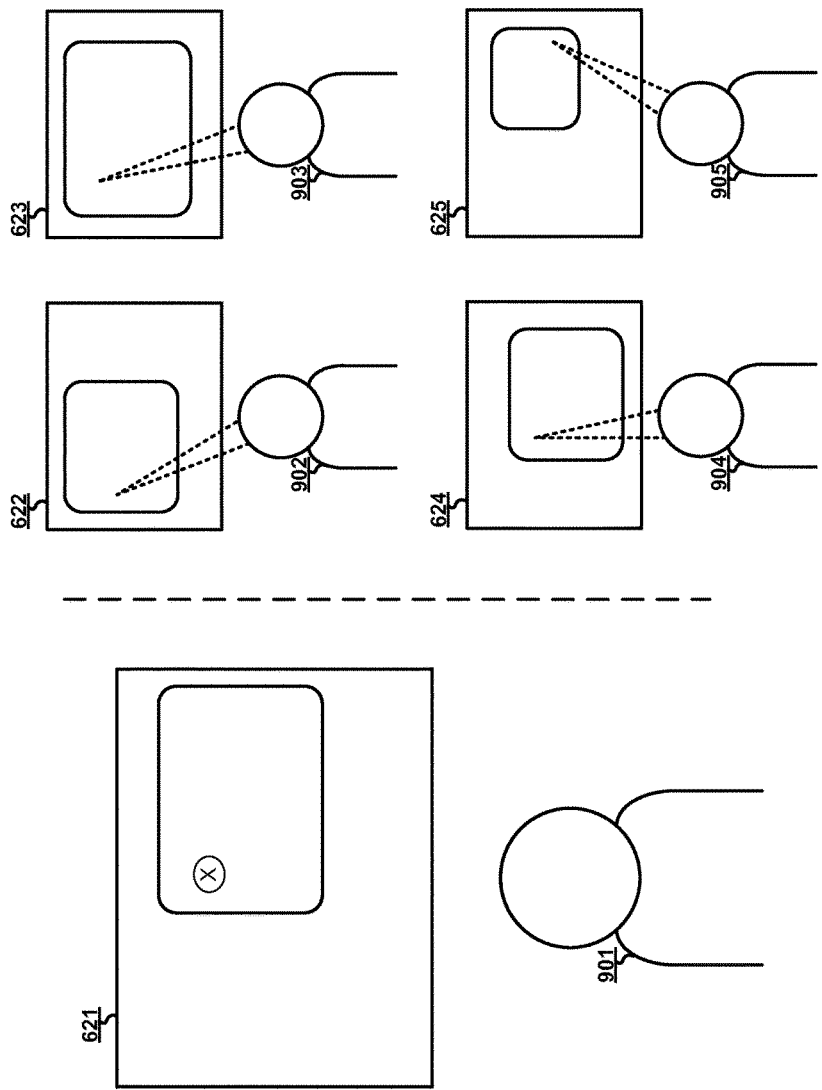
FIG. 10 illustrates an example of indicating eye tracking information during a real-time web conferencing session.

In some embodiments, instead of displaying a separate graphical indication 2-5, a single indication may be displayed that represents an average location. In particular, FIG. 10 includes identical elements as FIG. 9. However, display 621 displays a single graphical indicator X which represents an average of the graphical location indicators 2-4. In this example, the location of graphical indicator X is determined by removing the outlier location of graphical indicator 5, otherwise indicator X may be further right within the visual content window towards where indicator 5 was located. As the average location in which the participants are looking within the content changes, then the graphical indicator X will move around the content window in display 621 accordingly. In alternative embodiments, the outlier location may be indicated separately from indicator X to draw presenter 901's attention to that participant being an outlier. Likewise, if there are multiple location groups, the average location indicator X may be separated into multiple indicators indicating the multiple location groupings.

Figure 11:
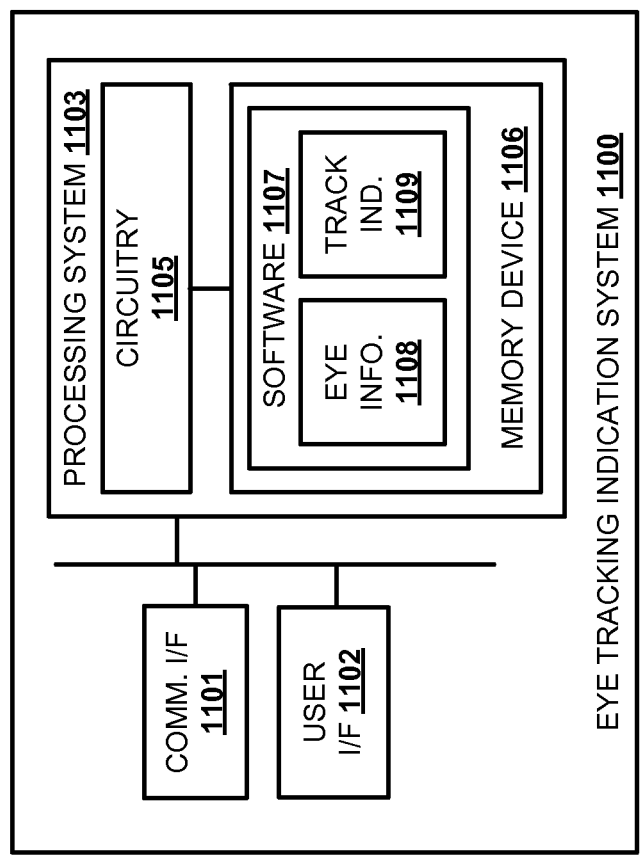
FIG. 11 illustrates an eye tracking indication system for indicating eye tracking information during a real-time communication session.

FIG. 11 illustrates eye tracking information system 1100. Eye tracking information system 1100 is an example of computing system 101, client device 601, or conferencing system 606, although any of those elements could use alternative configurations. Eye tracking information system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107. Eye tracking information system 1100 may include other well-known components such as a battery and enclosure that are not shown for clarity. Eye tracking information system 1100 may be a telephone, computer, e-book, mobile Internet appliance, media player, game console, wireless network interface card, or some other wireless communication apparatus—including combinations thereof.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user to receive user inputs and to present media and/or information. User interface 1102 may include a speaker, microphone, buttons, lights, display screen, touch screen, touch pad, scroll wheel, communication port, or some other user input/output apparatus—including combinations thereof. User interface 1102 may further include an eye tracking system if eye tracking information system 1100 is further configured to generate eye tracking information. User interface 1102 may be omitted in some examples.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Processing circuitry 1105 is typically mounted on a circuit board that may also hold memory device 1106 and portions of communication interface 1101 and user interface 1102. Operating software 1107 comprises computer programs, firmware, or some other form of machine-readable processing instructions. Operating software 1107 includes eye tracking information module 1108 and eye tracking indication module 1109. Operating software 1107 may further include an operating system, utilities, drivers, network interfaces, applications, or some other type of software. When executed by processing circuitry 1105, operating software 1107 directs processing system 1103 to operate eye tracking information system 1100 as described herein.

In particular, eye tracking information module 1108 directs processing system 1103 to receive, via communication interface 1101, first eye tracking information captured by a first computing system operated by a first user during a communication session with a second computing system operated by a second user, wherein the first eye tracking information represents a first location on a display of the first computing system to where eyes of the first user are directed. Eye tracking indication module 1109 directs processing system 1103 to determine a second location on a display of the second computing system that corresponds to the first location and instruct the display of the second computing system to display a first indication of the second location in real-time with the communication session.

Figure 12:
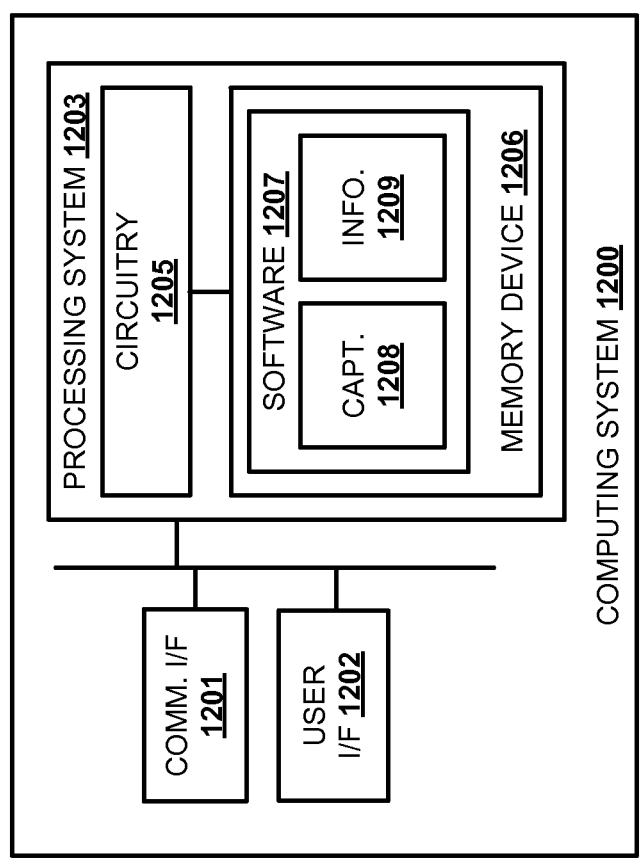
FIG. 12 illustrates a computing system for indicating eye tracking information during a real-time communication session.

FIG. 12 illustrates computing system 1200. Computing system 1200 is an example of computing system 102 and client devices 602-605, although any of those elements could use alternative configurations. Computing system 1200 comprises communication interface 1201, user interface 1202, and processing system 1203. Processing system 1203 is linked to communication interface 1201 and user interface 1202. Processing system 1203 includes processing circuitry 1205 and memory device 1206 that stores operating software 1207. Computing system 1200 may include other well-known components such as a battery and enclosure that are not shown for clarity. Computing system 1200 may be a telephone, computer, e-book, mobile Internet appliance, media player, game console, wireless network interface card, or some other wireless communication apparatus—including combinations thereof.

Communication interface 1201 comprises components that communicate over communication links, such as network cards, ports, RF transceivers, processing circuitry and software, or some other communication devices. Communication interface 1201 may be configured to communicate over metallic, wireless, or optical links. Communication interface 1201 may be configured to use TDM, IP, Ethernet, optical networking, wireless protocols, communication signaling, or some other communication format—including combinations thereof.

User interface 1202 comprises components that interact with a user to receive user inputs and to present media and/or information. User interface 1202 may include a speaker, microphone, buttons, lights, display screen, touch screen, touch pad, scroll wheel, communication port, or some other user input/output apparatus—including combinations thereof. User interface 1202 includes an eye tracking system. The eye tracking system comprises a plurality of optical sensors (e.g. cameras) to capture a user's eyes. The eye tracking system may further include light projectors to enhance the optical sensors' ability to capture the user's eyes and may include its own dedicated processing circuitry to process captured optical information.

Processing circuitry 1205 comprises microprocessor and other circuitry that retrieves and executes operating software 1207 from memory device 1206. Memory device 1206 comprises a non-transitory storage medium, such as a disk drive, flash drive, data storage circuitry, or some other memory apparatus. Processing circuitry 1205 is typically mounted on a circuit board that may also hold memory device 1206 and portions of communication interface 1201 and user interface 1202. Operating software 1207 comprises computer programs, firmware, or some other form of machine-readable processing instructions. Operating software 1207 includes eye tracking capture module 1208 and eye tracking information module 1209. Operating software 1207 may further include an operating system, utilities, drivers, network interfaces, applications, or some other type of software. When executed by processing circuitry 1205, operating software 1207 directs processing system 1203 to operate computing system 1200 as described herein.

In particular, during a communication session eye tracking capture module 1208 directs processing system 1203 to identify, via the eye tracking system of user interface 1201, a first location on a display of the computing system to where eyes of the first user are directed. Eye tracking information module 1209 directs processing system 1203 to generate eye tracking information representing the first location and transfer the eye tracking information to a second computing system. The second computing system displays an indication of a second location corresponding to the first location in real-time with the communication session The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of indicating eye tracking information during a communication session, comprising:
   receiving first eye tracking information captured by a first computing system operated by a first user during the communication session with a second computing system operated by a second user, wherein the first eye tracking information represents a first location on a display of the first computing system to where eyes of the first user are directed;
   determining a second location on a display of the second computing system that corresponds to the first location; and
   instructing the display of the second computing system to display a first indication of the second location in real-time with the communication session.

2. The method of claim 1, further comprising:
   receiving additional eye tracking information that represents additional display locations to where eyes of additional users are directed;
   determining second additional locations on the display of the second computing system that correspond to the additional display locations; and
   instructing the display of the second computing system to display additional indications of the second additional locations.

3. The method of claim 2, further comprising:
   averaging the second location and the second additional locations to generate a composite location;
   wherein the first indication and the additional indications comprise a single indication of the composite location.

4. The method of claim 3, further comprising:
   removing outlier locations from the second location and the second additional locations before averaging.

5. The method of claim 2, wherein the first indication and each of the additional indications identify a user associated with each respective indication.

6. The method of claim 1, wherein the first indication comprises a graphical overly at the second location.

7. The method of claim 1, wherein the first location corresponds to a location within visual content presented on the display of the first computing system and wherein determining the second location comprises:
   translating the location within the visual content to the visual content as presented on the display of the second computing system.

8. The method of claim 7, wherein the communication session comprises a web conference between at least the first user and the second user and the visual content comprises content displayed during the web conference.

9. The method of claim 1, further comprising:
   storing the eye tracking information and the communication such that an indication of the eye tracking information can be displayed in conjunction with a replay of the communication session.

10. A non-transitory computer readable storage medium having instructions stored thereon for operating an eye tracking information system, the instructions, when executed by the eye tracking information system, direct the eye tracking information system to:
    receive first eye tracking information captured by a first computing system operated by a first user during a communication session with a second computing system operated by a second user, wherein the first eye tracking information represents a first location on a display of the first computing system to where eyes of the first user are directed;
    determine a second location on a display of the second computing system that corresponds to the first location; and
    instruct the display of the second computing system to display a first indication of the second location in real-time with the communication session.

11. The non-transitory computer readable storage medium of claim 10, wherein the instructions further direct the eye tracking information system to:
    receive additional eye tracking information that represents additional display locations to where eyes of additional users are directed;
    determine second additional locations on the display of the second computing system that correspond to the additional display locations; and
    instruct the display of the second computing system to display additional indications of the second additional locations.

12. The non-transitory computer readable storage medium of claim 11, wherein the instructions further direct the eye tracking information system to:
    average the second location and the second additional locations to generate a composite location;
    wherein the first indication and the additional indications comprise a single indication of the composite location.

13. The non-transitory computer readable storage medium of claim 12, wherein the instructions further direct the eye tracking information system to:
    remove outlier locations from the second location and the second additional locations before averaging.

14. The non-transitory computer readable storage medium of claim 11, wherein the first indication and each of the additional indications identify a user associated with each respective indication.

15. The non-transitory computer readable storage medium of claim 10, wherein the first indication comprises a graphical overly at the second location.

16. The non-transitory computer readable storage medium of claim 10, wherein the first location corresponds to a location within visual content presented on the display of the first computing system and wherein the instructions that direct the eye tracking information system to determine the second location comprise instructions that direct the eye tracking information system to:
 translate the location within the visual content to the visual content as presented on the display of the second computing system.

17. The non-transitory computer readable storage medium of claim 16, wherein the communication session comprises a web conference between at least the first user and the second user and the visual content comprises content displayed during the web conference.

18. The non-transitory computer readable storage medium of claim 10, wherein the instructions further direct the eye tracking information system to:
 store the eye tracking information and the communication session such that an indication of the eye tracking information can be displayed in conjunction with a replay of the communication session.

19. A non-transitory computer readable storage medium having instructions stored thereon for operating a computing system operated by a first user, the instructions, when executed by the computing system, direct the computing system to:
 during a communication session, identify a first location on a display of the computing system to where eyes of the first user are directed;
 generate eye tracking information representing the first location; and
 transfer the eye tracking information to a second computing system, wherein the second computing system displays an indication of a second location corresponding to the first location in real-time with the communication session.

20. The non-transitory computer readable storage medium of claim 19, wherein the indication comprises a graphical overly at the second location.

* * * * *